No. 876,638.

PATENTED JAN. 14, 1908.

C. N. HARRINGTON.
TRAP.
APPLICATION FILED SEPT. 16, 1907.

2 SHEETS—SHEET 1.

Witnesses

Inventor
C. N. Harrington
By Woodward Chandler
Attorneys

No. 876,638. PATENTED JAN. 14, 1908.
C. N. HARRINGTON.
TRAP.
APPLICATION FILED SEPT. 16, 1907.
2 SHEETS—SHEET 2.
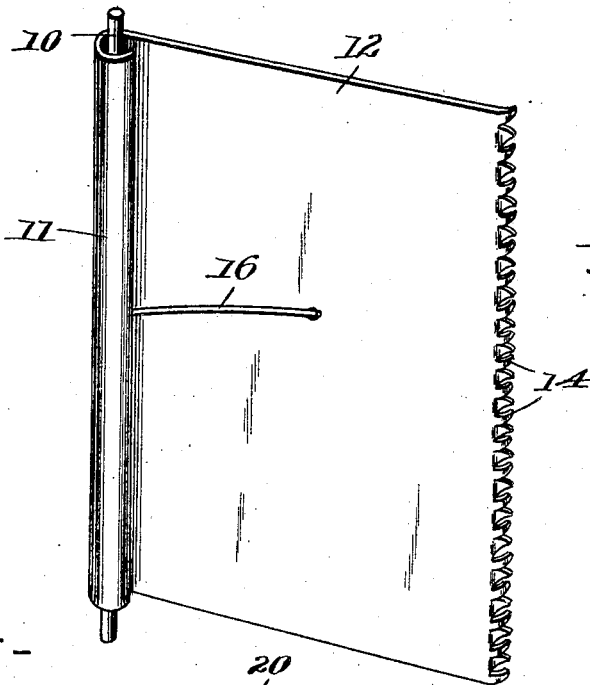
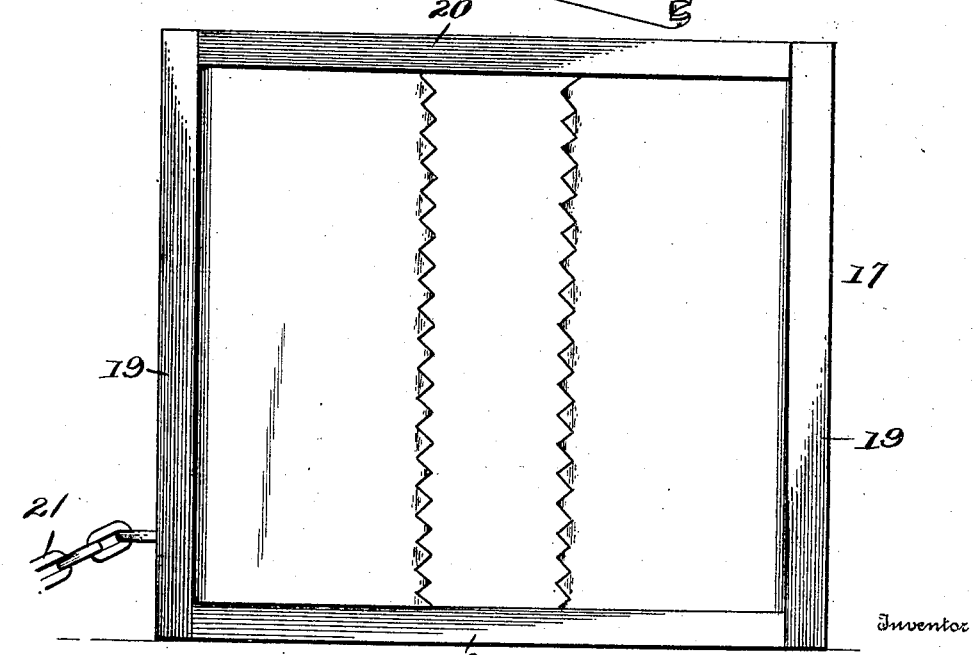

UNITED STATES PATENT OFFICE.

CLAUDE N. HARRINGTON, OF AVON, MINNESOTA.

TRAP.

No. 876,638.

Specification of Letters Patent.

Patented Jan. 14, 1908.

Application filed September 16, 1907. Serial No. 393,162.

*To all whom it may concern:*

Be it known that I, CLAUDE N. HARRINGTON, a citizen of the United States, residing at Avon, in the county of Stearns and State of Minnesota, have invented certain new and useful Improvements in Traps, of which the following is a specification.

This invention relates to traps, and has for its object to provide a trap adapted for catching animals, birds, or reptiles, and which will be in an operative position at all times.

A further object in this invention is to provide a trap having swinging gates, which gates may be used in connection with a box or case, or with an open framework.

Other objects and advantages will be apparent from the following description, and it will be understood that changes in the specific structure shown and described may be made within the scope of the claims without departing from the spirit of the invention.

Figure 1:
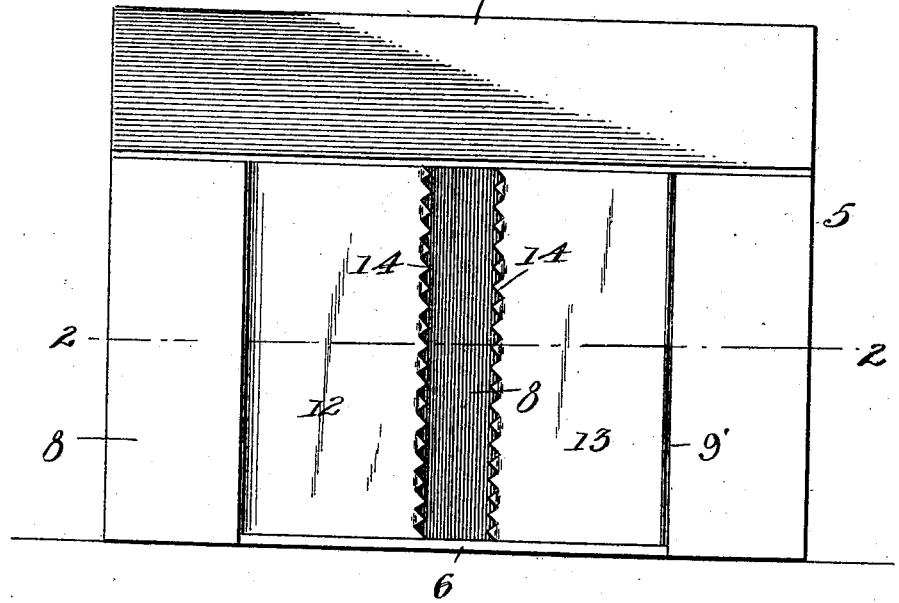
Figure 2:
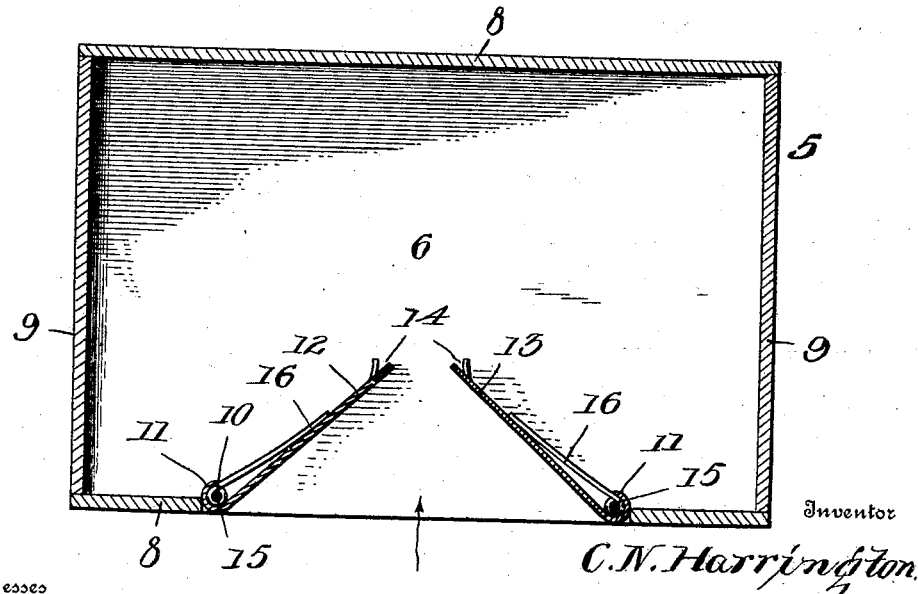

In the drawings forming a portion of this specification and in which like numerals of reference indicate similar parts in the several views, Figure 1 is a front elevation of my invention, Fig. 2 is a section on the line 2—2 in Fig. 1, Fig. 3 is a detail perspective view of one of the gates Fig. 4 is a detail of a modified form of my invention.

Referring now more particularly to the drawings, there is shown a box or cage 5, which consists of the bottom and top members 6 and 7 respectively, and the connecting sides and end members 8 and 9 respectively.

The front member 8 of the cage 5 is provided with an opening 9' as shown, and in this opening and at the ends thereof there are shown vertically extending rods 10, and these rods receive the curled ends 11, of gates 12 and 13 respectively. The inner edges of the gates 12 and 13 respectively are toothed, as shown at 14.

The gates 12 and 13 respectively normally lie at an obtuse angle within the cage 5, and to accomplish this, springs 15 are coiled about the rods 10 and are arranged to lie within the curled ends 11 of the gates 12 and 13. One end 16 of the springs is secured to the gates 12 and 13 for holding the gates normally open, and the other end of the springs are secured to the rod 10.

In the form of my invention shown at Fig. 4, there is shown an open frame 17, and this frame consists of the lower and horizontally extending bar 18, the connecting vertical bars 19, and a connecting upper member 20. A chain 21 or other flexible connection is shown as connected to the frame, and this chain may thus be attached to a suitable anchor, not shown.

It may be stated, that the space between the gates 13 is adjusted by springs of different tensions to permit the cage being used on different occasions, and these springs thus keep the gates with their ends in spaced relation to each other. It will of course be understood that an animal, bird or reptile enters the cage in the direction of the arrow in Fig. 2, and upon a forward movement of the animal, the gates will be swung inwardly and toward the ends 9 of the cage 5, and if an attempt be made by the animal to withdraw itself between the gates, the gates will of course be drawn inwardly and toward their normal position, and in this movement of the gates, the teeth 14 thereof will be forced into the animal and sufficient pain inflicted to cause the animal to enter the cage.

The form of the invention shown in Fig. 4 may be used to an advantage in a mink way, and by properly placing the traps therein with one at either end, they would take all mink passing into the space between the gates from either direction. This form of my invention will also be found effective in catching birds, and it will be understood that the action of the gates 13 and 14 is the same as previously described. If an attempt be made to withdraw, the bird picks up the trap which then becomes a collar, thus holding the victim securely and without injury. If the victim pulls on the chain 21 or tries to dislodge the trap by pushing it off, such action of course, tightens the gates and the animal is thus forced into submission.

What is claimed is:

1. A trap of the class described comprising an inclosure, the inclosure having an opening in one of its walls, gates pivotally mounted within the opening, the gates having their outer ends toothed and inner ends curled, and springs disposed within the curled ends of said gates, each spring having one end fixed independently of the curled end of the gate within which it is located and the other end being attached to said gate.

2. A trap of the class described comprising a cage having an opening in one of its walls, vertically extending rods secured within the opening at opposite sides thereof, gates located within the opening, the gates having their outer ends toothed and their inner ends curled about the rods, and springs secured to the rod and to the gates for holding the gates with their toothed ends in spaced relation.

In testimony whereof I affix my signature, in presence of two witnesses.

CLAUDE N. HARRINGTON.

Witnesses:
VICTOR S. HIMSL,
THEO. J. M. HOESCHEN.